United States Patent
Valerino, Sr.

(10) Patent No.: US 8,116,906 B2
(45) Date of Patent: Feb. 14, 2012

(54) PNEUMATIC TUBE CARRIER TRACKING SYSTEM

(75) Inventor: Fredrick M. Valerino, Sr., Timonium, MD (US)

(73) Assignee: Pevco Systems International, Inc., Baltimore, MD (US)

( * ) Notice: Subject to any disclaimer, the term of this patent is extended or adjusted under 35 U.S.C. 154(b) by 785 days.

(21) Appl. No.: 12/288,129

(22) Filed: Oct. 16, 2008

(65) Prior Publication Data

US 2010/0100226 A1   Apr. 22, 2010

(51) Int. Cl.
*G06F 7/00* (2006.01)
(52) U.S. Cl. .......................... 700/229; 700/226
(58) Field of Classification Search .................. 700/229, 700/226, 230; 406/4, 1, 110, 112, 3
See application file for complete search history.

(56) References Cited

U.S. PATENT DOCUMENTS

| | | | |
|---|---|---|---|
| 2,679,990 A | 6/1954 | Mathzeit et al. | |
| 4,084,770 A | 4/1978 | Warmann | |
| 4,157,796 A | 6/1979 | Warmann | |
| 4,820,086 A | 4/1989 | Kieronski | |
| 5,192,170 A | 3/1993 | Lang | |
| 5,217,328 A | 6/1993 | Lang | |
| 5,234,292 A | 8/1993 | Lang | |
| 5,636,947 A | 6/1997 | Valerino, Sr. et al. | |
| 5,712,789 A * | 1/1998 | Radican | 700/226 |
| 5,805,454 A | 9/1998 | Valerino, Sr. et al. | |
| 5,864,485 A * | 1/1999 | Hawthorne et al. | 700/229 |
| 5,896,297 A | 4/1999 | Valerino, Sr. | |
| 6,048,086 A | 4/2000 | Valerino, Sr. | |
| 6,173,212 B1 | 1/2001 | Valerino, Sr. | |
| 6,202,004 B1 | 3/2001 | Valerino, Sr. | |
| 6,477,442 B1 | 11/2002 | Valerino, Sr. | |
| 6,599,476 B1 | 7/2003 | Watson et al. | |
| 6,702,150 B2 | 3/2004 | Sumetzberger | |
| 6,712,561 B1 | 3/2004 | Valerino, Sr. et al. | |
| 7,243,002 B1 | 7/2007 | Hoganson et al. | |
| 7,328,084 B1 | 2/2008 | Hoganson et al. | |
| 7,363,106 B1 | 4/2008 | Hoganson et al. | |
| 7,424,340 B2 * | 9/2008 | Owens | 700/230 |
| 2005/0049746 A1 | 3/2005 | Rosenblum | |

* cited by examiner

*Primary Examiner* — Ramya Burgess
(74) *Attorney, Agent, or Firm* — Ward & Zinna, LLC

(57) ABSTRACT

A system and method provides for a pneumatic tube carrier tracking system having a system control module that captures and presents tracking information associated with sending and receiving carriers. The pneumatic tube carrier tracking system comprises sending and receiving stations connected by pneumatic tubing, and which are configured to securely send carriers, with receiving users optionally being restricted from unauthorized access of carriers. The sending and receiving stations have identifying tag readers configured to scan identifier tags to read carrier delivery, carrier receipt and receiving user information. Destination and intended recipient information are entered at the sending station when sending a carrier and are transmitted to a system control module, which routably delivers and secures the carriers in response the destination and intended recipient information.

25 Claims, 9 Drawing Sheets

PNEUMATIC TUBE CARRIER TRACKING SYSTEM

FIELD OF THE INVENTION

The present principles generally relate to pneumatic tube delivery systems. More specifically, the present principles refer to a system and method for tracking carriers and associated payloads in pneumatic tube delivery systems, while optionally securing the contents. The system comprises a scanner that allows a user to capture unique identifiers for individual carriers and contents, sending stations, receiving stations and sending and receiving users. A database disposed within the system also permits the user to archive and retrieve data associated with sending and receiving deliveries through the pneumatic tube system. Further, the system comprises the ability to institute security measures such as holding a carrier until a receiving user's identification (hereinafter "ID") is entered into, and verified by, the tracking system.

BACKGROUND OF THE INVENTION

In large institutional settings such as hospitals, the dispensing and delivery of drugs has become a time consuming process. In particular, sterile items, controlled medications, biological samples, and the like need to be prepared and transported in a secure environment while ensuring the safety of patients and hospital workers.

Transporting objects via pneumatic tubes is known to the art. Pneumatic delivery systems are used extensively for the rapid and efficient transportation of a wide variety of articles. These delivery systems are used in a number of business operations, including, but not limited to, banks, hospitals, office buildings, industrial plants, and transportation terminals.

To send a payload in a carrier, an object is placed within a carrier which is then transported within enclosed pneumatic tubing by air under either positive or negative pressure to a desired destination. The interior of the closed tube and the outer dimension of the carrier form a seal so that the carrier can be propelled between the destinations by a vacuum or positive air pressure.

One specific area of commerce which currently uses the pneumatic tube for transporting materials is the hospital or biomedical research/manufacturing industry. Pneumatic tube delivery systems have proven to be particularly useful for transporting blood samples, medicines, intravenous bags, viral samples or other biological or chemical matter within hospitals or laboratories. Some of the payloads transported may be highly addictive drugs (i.e. morphine) which need to be tightly controlled.

Thus, there is clearly a need for a system providing a secure pneumatic tube carrier delivery. A need exists for a system providing tracking of carriers in a pneumatic tube system to ensure the secure delivery of carrier contents to authorized end users. Furthermore, there is a need for an auditable trail indicating the chain of custody of carrier contents.

According to the present principles there is provided a pneumatic tube carrier tracking system for tracking carriers in a pneumatic tube system comprising a pneumatic tube system, a connecting diverter with blower, and storage piping with diverters, sending and receiving stations, a system control module, and identifying tag readers configured to read identifying tags. The identifying tag readers scan delivery information to provide secure and authorized delivery of carriers and their contents. The identifying tag readers and system control together provide an efficient and secure method and system of tracking carriers and carrier contents throughout the pneumatic tube system.

SUMMARY OF THE INVENTION

Presented herein is a pneumatic tube carrier tracking system having a system control module that captures and presents tracking information associated with sending and receiving carriers. The system control module comprises a database module and a computer control center (hereinafter "CCC") module in signal communication with the database module.

The pneumatic tube carrier tracking system further comprises a sending station and a receiving station. The sending station and the receiving station are routably connected by pneumatic tubing for the delivery of carriers. The sending station has an identifying tag reader configured to scan identifier tags to obtain delivery and identifying information for a carrier. The identifying tag reader then transmits the delivery information to the system control module. The receiving station has an identifying tag reader configured to scan identifier tags to obtain and transmit reception information for a carrier to the system control module.

The identifying tag reader transmits delivery information and reception information to the CCC module which interprets delivery information and reception information and sends commands to the pneumatic tube system to control routing of the carrier in the pneumatic tubing. The database module is configured to receive and store delivery information sent to the System Control Module from the sending station and reception information from the receiving station.

According to a method of using the present invention, the carrier contents are prepared for a carrier to be sent to the pneumatic tube carrier tracking system. Identifying tags are scanned using the identifying tag reader at the sending station to capture delivery information. The delivery information is transmitted from the identifying tag reader to the system control module and the carrier is sent through the pneumatic tubing system from the sending station. The system control module receives the incoming delivery information from the identifying tag readers at the sending station and logs and stores this information in the database module. The CCC module interprets the delivery information and sends commands to the pneumatic tube system to control the operations of the system and routably deliver the carrier. The carrier is routed through the pneumatic tube system in response to the delivery information and sensed by optical sensors in the branches of the pneumatic tubing until it reaches the receiving station. The carrier is delivered to the receiving station where identifier tags are scanned by an identifying tag reader to capture reception information. The reception information is transmitted to the system control module from the identifying tag reader and the sender at the sending station is optionally notified that the carrier has been delivered.

BRIEF DESCRIPTION OF THE DRAWINGS

A further understanding of the present principles can be obtained by reference to a preferred embodiment, along with alternative embodiments, set forth in the accompanying drawings where like reference numbers indicate like elements throughout the drawings. Although the illustrated embodiments are merely exemplary of systems for carrying out the present principles, the organization and method of operation of the principles in general, together with further objectives and advantages thereof, may be more easily understood by reference to the drawings and the following description. The drawings are not intended to limit the scope of the principles, which is set forth with particularity in the claims as appended or as subsequently amended, but merely to clarify and exemplify the principles.

For a more complete understanding of the present principles, reference is now made to the following figures.

DETAILED DESCRIPTION

Illustrative embodiments of the present principles are disclosed herein. However, techniques, systems and operating structures in accordance with the present principles may be embodied in a wide variety of forms and modes, some of which may be different from those in the disclosed embodiment. Consequently, the specific functional details disclosed herein are merely representative, yet in that regard, they are deemed to afford the best embodiment for purposes of disclosure and to provide a basis for the claims herein which define the scope of the present principles.

Some elements of the present principles are illustrated as modules for performing described functions. While these modules may be described in terms of software implementations, any hardware, or combination of hardware and software may be used to implement the present principles without deviating from the scope or spirit thereof.

Moreover, well known methods and procedures for both carrying out the objectives of the present principles and illustrating the preferred embodiment are incorporated herein but have not been described in detail as not to unnecessarily obscure novel aspects of the present principles.

Figure 1:
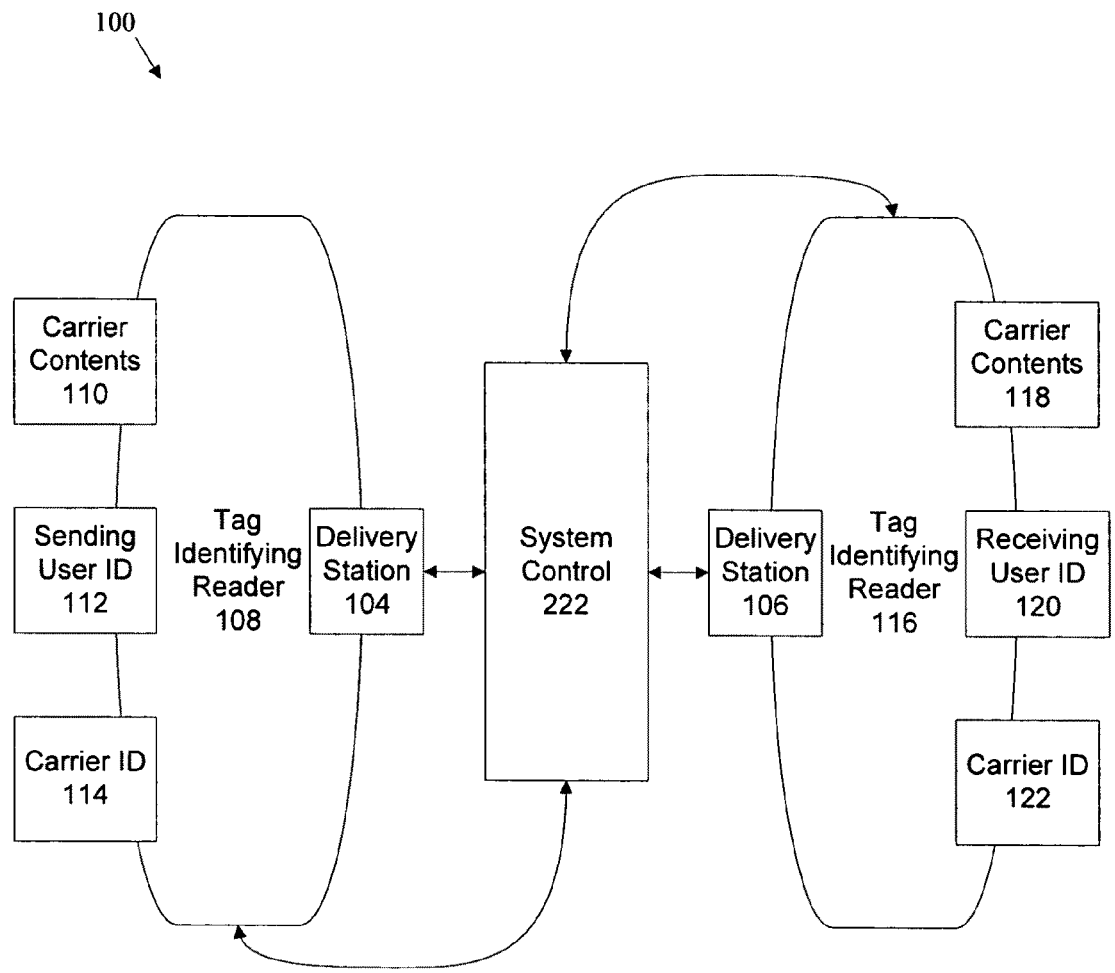
FIG. 1 is a diagram illustrating a system and method for tracking carriers and payloads in a pneumatic tube system according to an embodiment of the present principles.

Referring now to FIG. 1, a diagram illustrating a system and method for tracking carriers and payloads in a pneumatic tube system 100 according to an embodiment of the present principles is shown. System control module 222 controls the operation of pneumatic tube system 100, reading, storing, and presenting data, and tracking the delivery of carriers in response to the collected data. One or more identifying tag readers 108 may read and store a unique ID tag associated with the carrier contents or payload 110, or with the sending user's ID 112, the receiving user's ID 120, or the carrier ID 114. The identifying tag readers 108 may also read and store a unique ID tag associated with the sending station and delivery station. In one useful embodiment, an identifying tag reader 108 may read the ID tag of objects using an optical scanning system to read bar codes. Alternatively, an identifying tag reader 108 may employ an optical scanning system to identify characters and read and store the ID or identifier information of various objects. In another embodiment, the identifying tag reader 108 may identify objects using RFID or other radio frequency technology. Additionally, any other identification technology known, or as yet undiscovered, may be used within the scope of the present principles. The sending users ID may be a badge, a wristband, or the like. The identifying tag reader 108 may replace the need for a control panel, allowing all the necessary scanning, interpreting, and sending of a payload to be performed at one station. In alternative embodiments, the identifying tag reader 108 may be the sending station itself.

The identifying tag reader 108 sends identifier information from delivery station 104 to system control module 222. The delivery stations 104 and 106 may be a station primarily used to send or primarily used to receive payload containing carriers. However, delivery stations 104 and 106 may be used to both send and receive carriers.

System control module 222 receives identifier and delivery information from the identifying tag reader 108 at delivery station 104 and determines the appropriate actions to be performed on delivery station 106. For example, the system control module 222 may use the information from identifying tag reader 108 at delivery station 104 to determine to which delivery station 106 a carrier 610 will be routed and which receiving user ID 120 must be scanned in order for the receiving user to receive the carrier 610 (given that the sender requires the receiving user ID to be scanned prior to receiving the carrier). The receiving user at delivery station 106, upon receiving the carrier delivery, uses an identifying tag reader 116 to scan their ID 120, carrier contents 118, and the carrier ID 122, completing the transaction. This information is sent from the identifying tag reader 116 at delivery station 106 to system control module 222 to be recorded and stored in the system.

Figure 2:
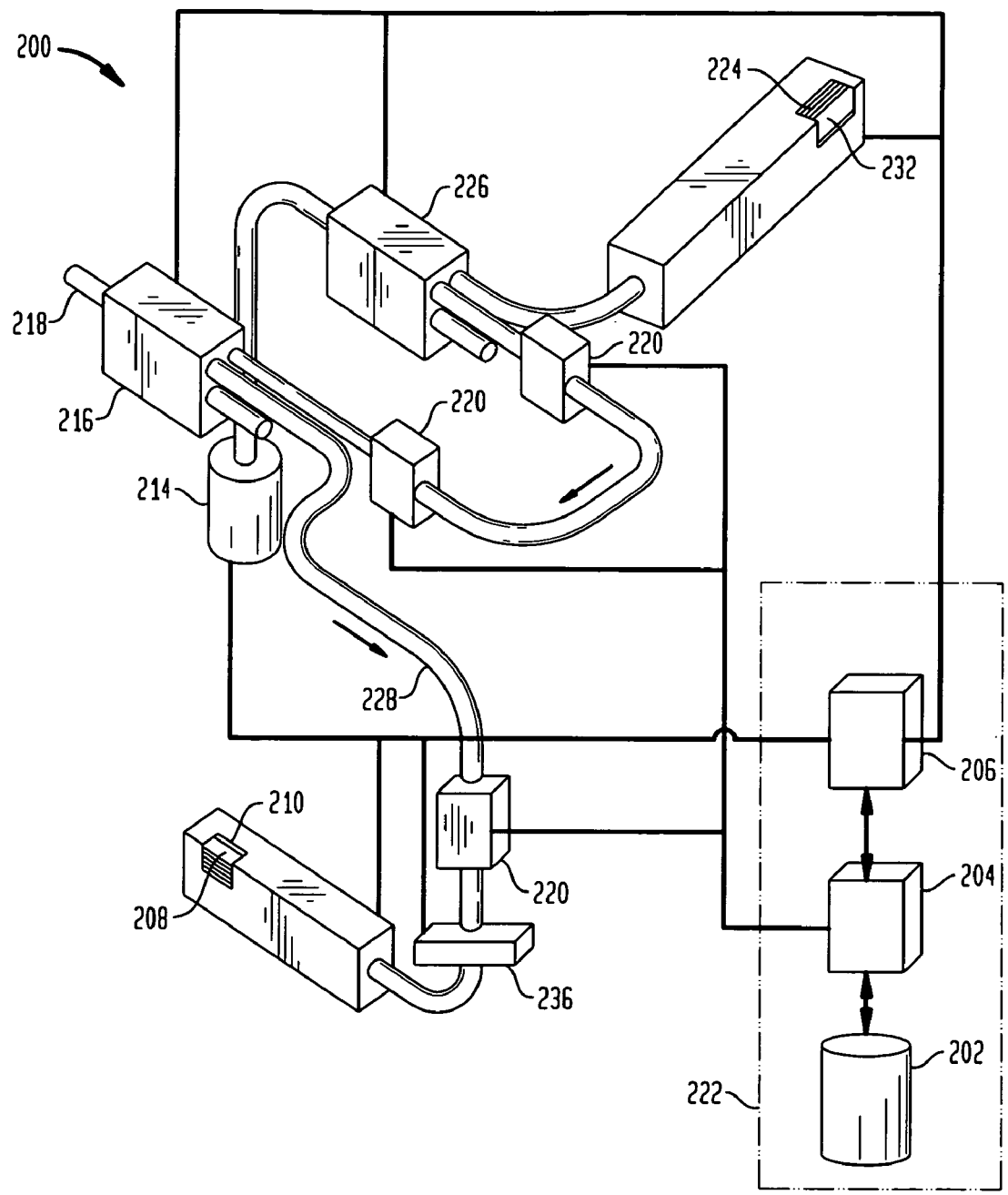
FIG. 2 is a diagram illustrating an automatic pneumatic tube system according to an embodiment of the present principles.

Referring now to FIG. 2, a diagram illustrating a pneumatic tube system 200 according to an embodiment of the present principles is shown. The pneumatic tube carrier tracking system 200 comprises transmission tubing 228, a system control module 222, and a sending station 224 and receiving station 208 for initiating the sending of carriers and receiving the sent carriers. Although FIG. 2 demonstrates a one zone pneumatic tube system 200, a system with multiple zones and the inclusion of any number of sending 224 and receiving stations 208 is possible without deviating from the scope of the present principles. The system also includes blower 214 and one or more diverters 216 and 226 which direct the transportation of carriers 610 from storage compartment 218 to sending station 224 or receiving station 208 at the direction of the system control module 222. Furthermore, pneumatic tube system 200 may include a plurality of inline identifying tag readers or optical sensors 220 configured to track or sense the carriers as they are transported through the tubing 228. The inline identifying tag readers or optical sensors 220 may be implemented for example, through a window or a section of the tubing 228, through an RFID antenna disposed on a recess section of the tubing 228, through an optical sensor disposed in the tubing 228, or the like. The inline identifying tag readers or optical sensors 220 read, or otherwise sense, the passage of a carrier associated with the payload being transported through the pneumatic tube system.

In one embodiment of the present principles, the ID tags may be used to record the location and ID 114 and 122 of a carrier 610 at various locations throughout the pneumatic tube system 200 to send to the system control module 222 in order to keep a log of each carrier's location information as they move through the pneumatic tubing 228. This creates an auditable trail indicating a chain of custody. It allows the user to know where the carrier and its contents have been and where they are going.

While the present principles are described with respect to a hospital, the present principles may also be used in, but are not limited to, banks, retail stores, pharmacies, laboratories, or the like.

ID tags may also be associated with the ID of sending and receiving users. The ID tag scanning at the sending stations 224 and receiving stations 208 may be performed by an identifying tag reader such as, for example, a handheld PDA 700. However, any identifying tag reader 108 and 116 configuration may be used including, but not limited to, a scanner integrated into the sending or receiving station, or any other known or as yet undiscovered configuration.

System control module 222 may include database module 202 and CCC module 206 in signal communication. The system control module 222 receives carrier information from the tag readers at the sending and receiving stations and logs the carrier information into a database module 202. Additionally, the system control module 222 may receive carrier location information from inline identifying tag readers or optical sensors 220 disposed throughout the pneumatic tube system 200 and log this information into a database manager 202.

The database module 202 may be, for example, a relational database, a flat file database, fixed length record database, or any other data storage mechanism known or as yet undiscovered in the art. Further, the database module 202 may reside on a stand-alone server, or the same machine as the CCC module 206.

The CCC module 206 manages data by interpreting data stored in the database module 202 and sending routing commands to the pneumatic tube system based on location data and delivery information collected from sending users. In one useful embodiment, the CCC module 206 performs the functions of a data manager. In an alternative embodiment, there may be a separate data manager module to interpret the data stored in the database module 202 and send routing commands to the CCC module 206 which then sends commands to the pneumatic tube system based on location data and delivery information.

The sending station 224, diverters 216 and 226, blower 214, carrier receiving bin 210, and receiving station 208 are all in signal communication with, and controlled by, the CCC module 206. The CCC module 206 interprets the data in the database module 202 and generates commands in the form of signals to individual elements in the pneumatic tube system 200 to control the actions of the system 200. For example, the CCC module 206 may command the pneumatic tube system to activate the blower 214 to transport a carrier 610 through the pneumatic tube system 200. In response to data stored in the database module 202, the CCC module 206 may generate a signal to turn on blower 214, which blows air to move the carrier 610 throughout the pneumatic tube system 200. Similarly, the diverters 216 and 226 may be signaled by the CCC module 206 to route a carrier to a particular branch in the pneumatic transmission tubing 228 to be delivered to a desired receiving station 208.

The system control module 222 may also be configured to manage deliveries. The system control module 222 receives requests for delivery from a sending station 224. The data input by a user at a sending station 224 identifying tag reader 108 is used to determine the physical location of a carrier 610 and where the carrier 610 should be routed to. Additionally, the system control module 222 uses the information from the sending station 224 to determine how the carrier should be delivered (i.e. secured, with alarms, etc.).

System control module 222 may also track carriers 610 as they move past inline identifying tag readers or sensors 220 in the pneumatic tubing 228. The system control module 222 may generate records to show that a carrier 610 passed an inline identifying tag reader or sensor 220 at a certain time. These records may be used to ensure that carriers 610 are routed correctly and in the correct order. Location recordation may also be used to troubleshoot and initiate error notifications, such as a stuck or lost carrier 610, or may be used to guarantee or verify a timely delivery for perishable contents (i.e. drugs or blood contents that must be refrigerated). Additionally, reports on chain of custody of carriers may be generated to keep record of who has a specific carrier at a specific point in time and where that carrier is located.

The system control module 222 may also control and verify delivery to receiving users at receiving stations 208. In order to initialize a shipment, the sending user enters information into the sending station 224 that will be used to manage carrier 610 routing and delivery through the pneumatic tube system 200. The sending user prepares the contents of the carrier 610 for shipment. The contents of the carrier 610 may be, for example, prescriptions, blood samples, patient file information, and the like.

After the sending user prepares the contents of the carrier 610 for shipping from the product production station 232, the sending user may scan the ID of the carrier contents 110 with the handheld PDA 700. The sending user may also scan the sending user ID 112, the ID of the desired receiving station 106, and the ID of the carrier 114 with the handheld PDA 700.

In one useful embodiment, the sending user may work at a desk or station separate from the sending station and may place the carrier 610 on a conveyor belt at the product production station 232 to be delivered automatically to the sending station 224. The contents and the carrier 610 are brought to the sending station 224 via an incoming conveyor from the product production station 232. The product prepared by the sending user enters the carrier 610 through an opening in the top of the carrier 610. In one embodiment, a loaded carrier 610 may optionally be moved to an inspection station and subsequently sent into the pneumatic tube system 200 where it is delivered to the proper location in response to commands from the CCC module 206. Alternatively, the contents and the carrier 610 may be deposited directly into the sending station 224 by the sending user without the aid of a conveyor belt or inspection station.

In another useful embodiment, a more passive system may be used for the scanning of the delivery information. The identifier tags may be RFID tags which can be read by an RFID identifying tag reader. In such an embodiment, the sending user at the sending station 224 may move near the RFID identifying tag reader while holding the carrier and its contents, and the reader will read and send the ID information from the sender, the carrier, and the contents to the system control module 222. Thus, sending users may advantageously avoid physically scanning each identifier tag to obtain delivery information.

The scanned information from the handheld PDA 700 is transmitted to the system control module 222 where it is stored in the database module 202 and interpreted by the CCC module 206. The CCC module 206 then determines the destination of a particular carrier 610, and the necessary command to route the carrier 610 properly. The CCC module 206 sends routing commands to the pneumatic tube system 200 to control the operations of the system.

Blower 214 and diverters 216 and 226 may be used to coordinate and direct the transportation of the carriers throughout the pneumatic tube system 200 and between the storage compartment 218 and the pneumatic tube system 200. Carriers move through branches of the pneumatic tubing 228 in the system under vacuum or pressure supplied by blower 214. The CCC module 206 sends a signal to the blower 214 to blow air to transport the carrier 610 at the appropriate time. As the carriers move through the system, the CCC module 206 controls the carriers' 610 routing by transmitting commands to diverters 216 and 226 which may change the position and/or direction of the carriers 610. In an alternative embodiment, a vacuum system may be used in place of a blower 214 to move carriers 610 through the pneumatic tube system with negative air pressure.

In one embodiment, after the CCC module 206 routes the carriers 610 through the tubing 228 via the diverters 216 and 226, the carriers 610 travel to the carrier receiving bin 210 at the receiving station. At this station, the carrier 610 is opened and the contents of the carrier 610 are dropped in the carrier receiving bin 210. The ID of the empty carrier 122 may then be scanned with the handheld PDA 700 to keep record of which carriers 610 are available from the storage compartment 218 for other shipments.

Upon receipt of the contents the receiving user may scan their ID 120, and may also scan the ID tags of the carrier contents 118. This information is sent to the system control module 222 where it is stored in the database module 202 and interpreted by the CCC module 206. The CCC module may optionally notify the sending user of completion of the transaction according to the sending user's instructions entered when the carrier was initially sent.

In an alternative embodiment, a slide plate 236 may be disposed in the pneumatic tubing 228 at a location prior to the carrier receiving bin 210. The slide plate 236 may be used as a security measure, holding the carrier 610 above the carrier receiving bin 210 until the authorized receiving user scans their ID 120. The sending user may be given the option by the handheld PDA 700 prior to sending the carrier 610 from the sending station 224 of requiring the receiving user to scan the receiving user ID 120 before retrieving the contents. If the sending user requires the receiving user to scan the receiving user ID 120, the CCC module 206 will engage the slide plate 236 and hold the carrier 610 in the tube 228 above the carrier receiving bin 210 until the receiving user scans the receiving user ID 120. If the sending user does not require this security option, the carrier 610 will be allowed to move through slide plate 236 and into the carrier receiving bin 210. The inline identifying tag readers or optical sensors 220 disposed throughout the pneumatic tube system may also be associated with the slide plate because they are configured to sense the passage of the carrier and its contents through the pneumatic tubing until it reaches the slide plate. The inline identifying readers or optical sensors 220 may verify to the CCC module that the carrier has arrived at the slide plate at which point the CCC module may determine if a receiving user ID needs to be scanned.

In another embodiment, after each transaction is complete, the delivery information stored and recorded by the system control module 222 may be made accessible to users via a web browser. However, in alternative embodiments, this information may be accessible via stand-alone applications, hard copy documents, or any other useful report format. The delivery information may be used to audit compliance with delivery procedures, required time constraints, or to track any missing or problem deliveries.

Figure 3:
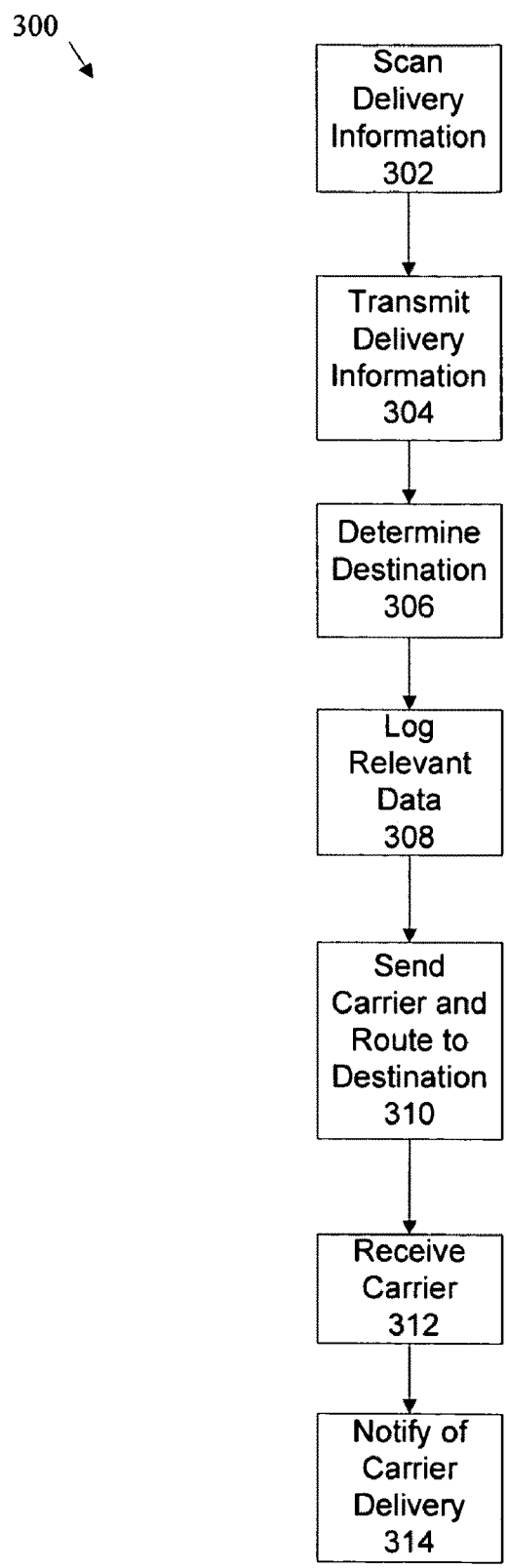
FIG. 3 is a flow chart illustrating a method for tracking carriers and payloads in a pneumatic tube system according to an embodiment of the present principles.

Referring now to FIG. 3, a flow chart illustrating a method 300 for tracking carriers and payloads in a pneumatic tube system 200 according to an embodiment of the present principles is shown. The sending user scans the delivery information in block 302. The identifying tag reader 108 disposed at the sending station 224 sends the information to the CCC module 206 in block 304. The CCC module 206 determines the physical destination of the carrier delivery in block 306. The data regarding the carrier delivery is then stored in the database module 202 in block 308. The CCC module 206 sends commands to the elements of the pneumatic tube system 200 in block 310 to route the carrier and to engage or open the slide door 236. Finally, the receiving user receives the carrier 610 delivery in block 312 and notification of the carrier delivery is sent to the sending user in block 314.

Figure 4:
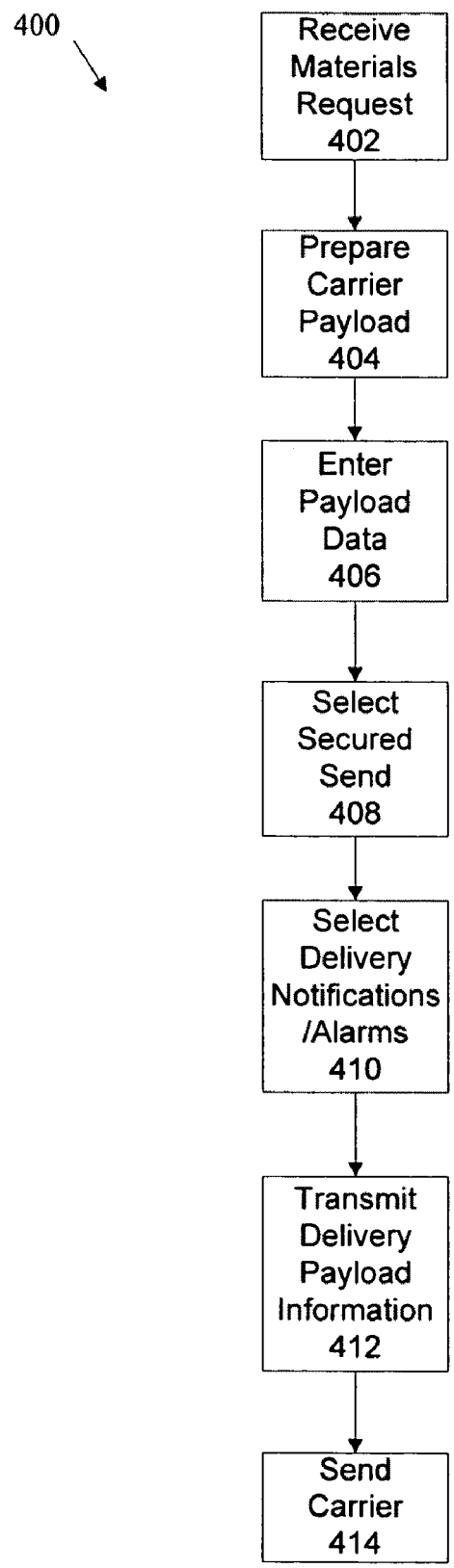
FIG. 4 is a flow chart illustrating a method of preparing and sending carriers and payloads from the sending station according to an embodiment of the present principles.

Referring now to FIG. 4, a flowchart illustrating a method of preparing and sending carriers and payloads 400 from the sending station 224 according to an embodiment of the present principles is shown. The sending user receives a request for a delivery (i.e. a prescription, blood sample, file information, or the like) in block 402. The sending user prepares the contents and requests a carrier 610 from the storage compartment 218 of the pneumatic tube system 200 via the handheld PDA 700 in block 404. Upon receipt of the carrier 610, the sending user may scan the carrier ID 114, content ID 110, the sending user's ID 112, the sending station ID 104, or the receiving station ID 106 using the identifying tag reader 108 in block 406. The sending user may optionally require the receiving user to scan the receiving user ID 120 before the carrier 610 moves to the carrier receiving bin 210 in block 408. If the sending user requires the receiving user to scan their ID 120 before the carrier 610 moves to the carrier receiving bin 210, then the sending user has the option of being notified if the receiving user ID 120 is not scanned after the carrier 610 moves to the carrier receiving bin 210 and to the receiving station 208. If the sending user chooses to be notified then they may select an alarm for notification from the handheld PDA 700 in block 410.

The sending user also has the option of being notified, for example, when the carrier 610 arrives at the receiving station 208, gets stuck in a tube 228, or contents have been spilled. If the sending user chooses to be notified when the carrier arrives at the receiving station 208, gets stuck in the tube 228, or contents have been spilled, then he/she selects a notification. If not, then in one embodiment, the sending user places the carrier 610 on the conveyor belt.

The sending user may send the carrier by pressing the send button on the handheld PDA 700. To send a carrier, the delivery information is sent to the system control module 222 in block 412. In response, the system control module 222 controls the pneumatic tube system to move the carrier 610. The carrier 610 leaves the sending station 224 and enters the pneumatic tube system 200 in block 414.

Figure 5:
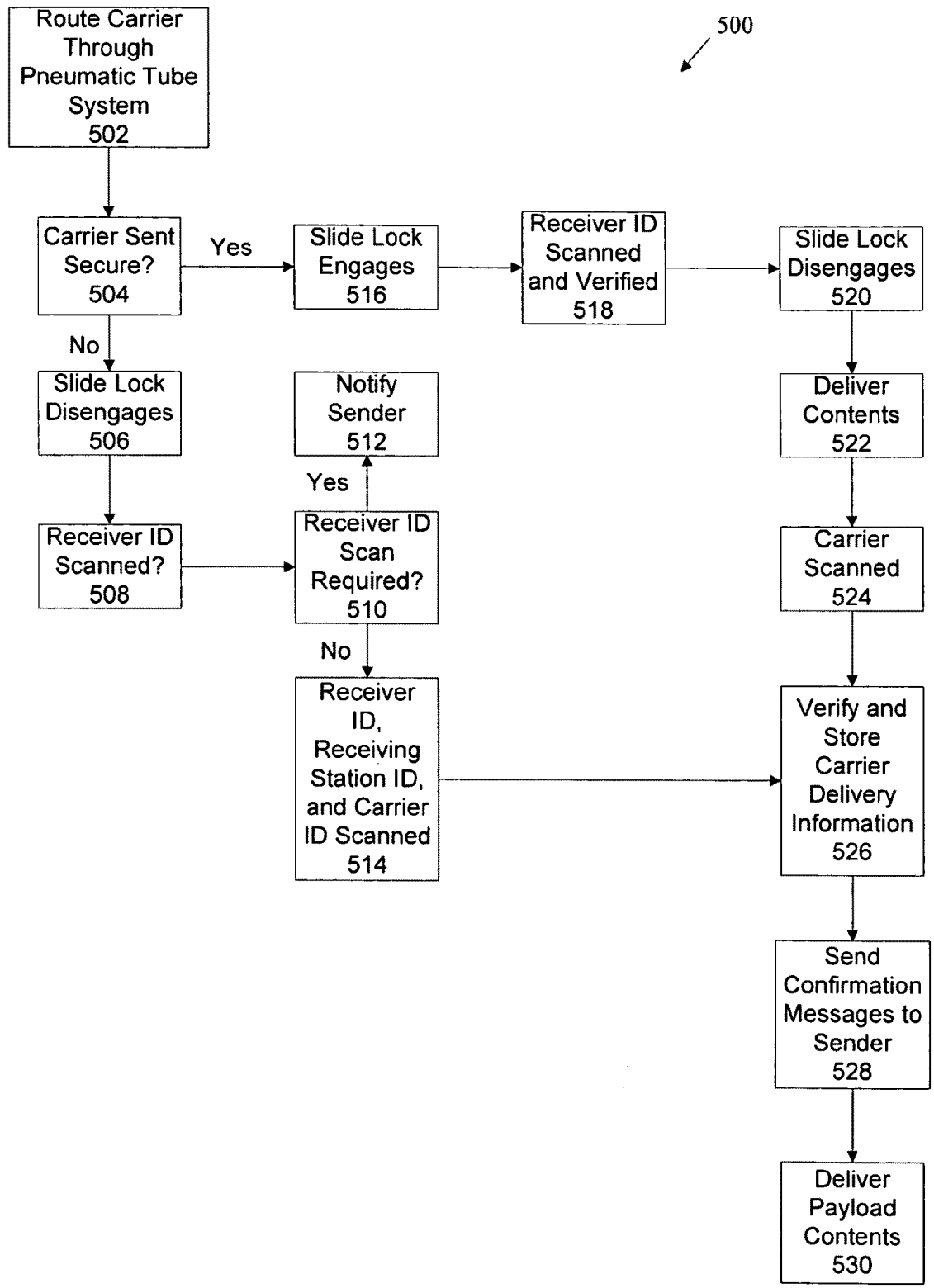
FIG. 5 is a flow chart illustrating a method of receiving the carriers and payloads from the receiving station according to an embodiment of the present principles.

Referring now to FIG. 5, a flowchart illustrating a method for receiving carriers and payloads 500 from the receiving station 208 according to an embodiment of the present principles is shown. The carrier 610 travels through the pneumatic tube system 200 in block 502 until the carrier 610 reaches the slide plate 236, and is retained at, or passed though, the slide plate in response to commands from the system control module in block 504.

If the sending user did not request that the receiving user scan their ID 120 before the carrier 610 reaches the carrier receiving bin 210, then the slide door opens in block 506, allowing the carrier 610 to move through to the carrier receiving bin 210 at the receiving station 208. The system control module 222 then determines whether or not the receiving user ID 120 was scanned in block 508.

If the receiving user ID 120 was scanned then the receiving user continues to scan the receiving station ID 106 and carrier ID 122 in block 514. If the receiving user ID is not scanned then the system control module 222 determines if the sending user requested notification if the receiving user ID 120 is not scanned in block 510. If the sending user requested notification than the system control module 222 sends an alarm notifying the sending user in block 512. If the sending user did not request notification then the receiving user scans the receiving station ID 106 and carrier ID 122 in block 514 and selects the accept button on the handheld PDA 700. The system control module 222 then verifies and stores the delivery information in block 526 and sends a confirmation message to the sending user in block 528. The contents 110 of the carrier 610 are then delivered to the end user in block 530.

If the sending user requests that the receiving user scan their ID 120 before the carrier 610 reaches the carrier receiving bin 210, then the system control module 222 engages the slide plate 236 in block 516, holding the carrier 610 in the pneumatic tubing 228. The receiving user must then scan their ID 120 and the receiving station ID 106 in block 518 in order to disengage the slide plate 236. After the receiving user ID 120 is scanned, the CCC module 206 verifies the user ID before unlocking the slide plate 236. After verification, the CCC module 206 commands the slide plate 236 to disengage. The receiving user then selects the drop carrier button on the handheld PDA and the slide plate 236 disengages in block 520, moving the carrier 610 through to the carrier receiving bin 210 and to the receiving station 208 in block 522. The receiving user scans the carrier ID 122 in block 524. The system control module 222 then verifies the delivery information in block 526 and if selected by the sending user, a confirmation message is sent to the sending user in block 528. The delivery information is sent to be stored in the database module 202 and the contents are delivered to the end user by the receiving user in block 530.

Figure 6A:
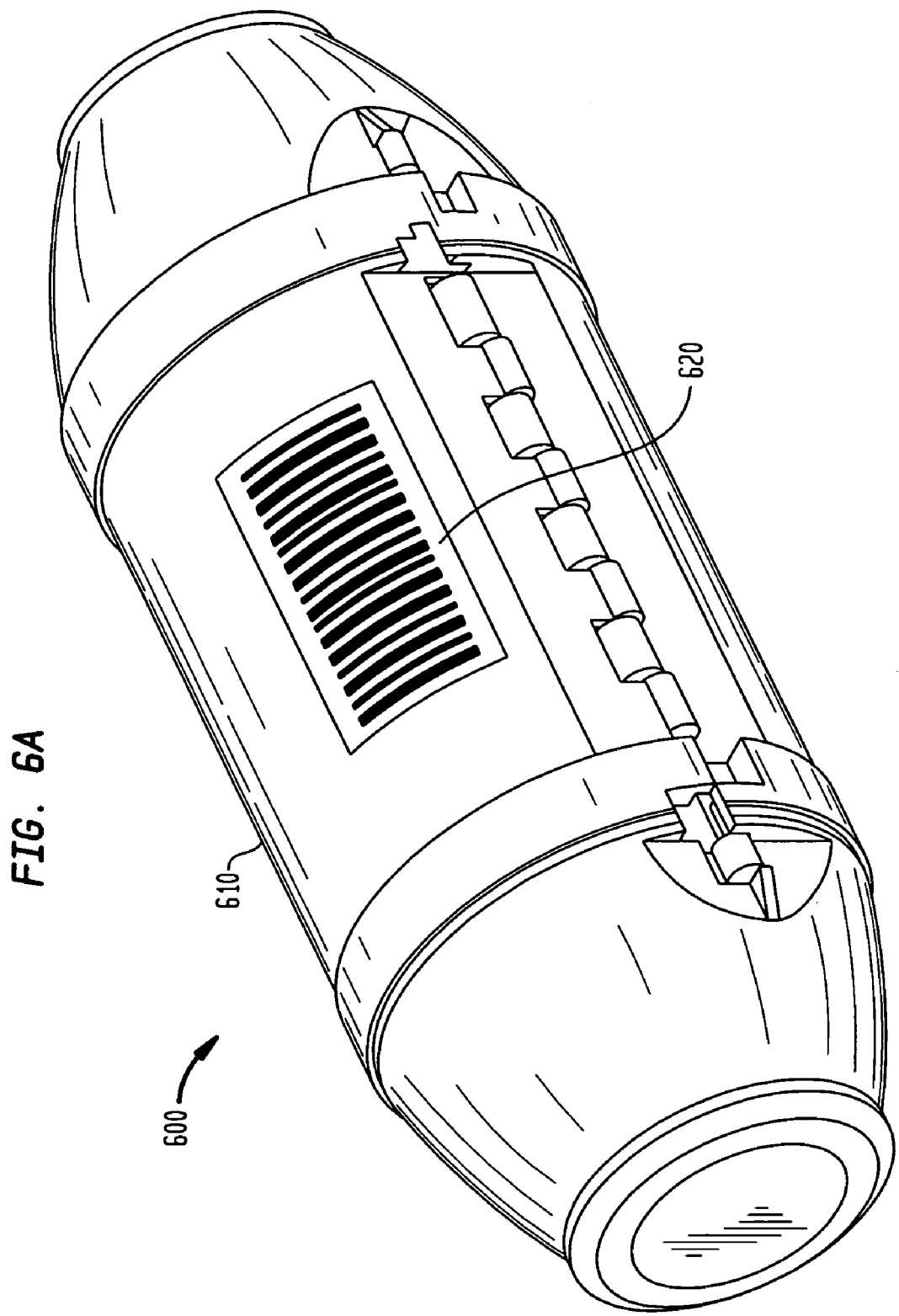
FIG. 6A is a diagram of a carrier having a bar code identifier tag according to an embodiment of the present principles.

Referring now to FIG. 6A, a diagram of the carrier 610 with a unique identifying, optically scannable, tag (i.e. a bar code) 620 according to an embodiment 600 of the present principles is shown. The bar code 620 may be disposed on any part of the carrier 610, enabling the inline identifying tag readers 220 to scan the bar code 620 and transmit the delivery information and reception information to the system control module 222.

Figure 6B:
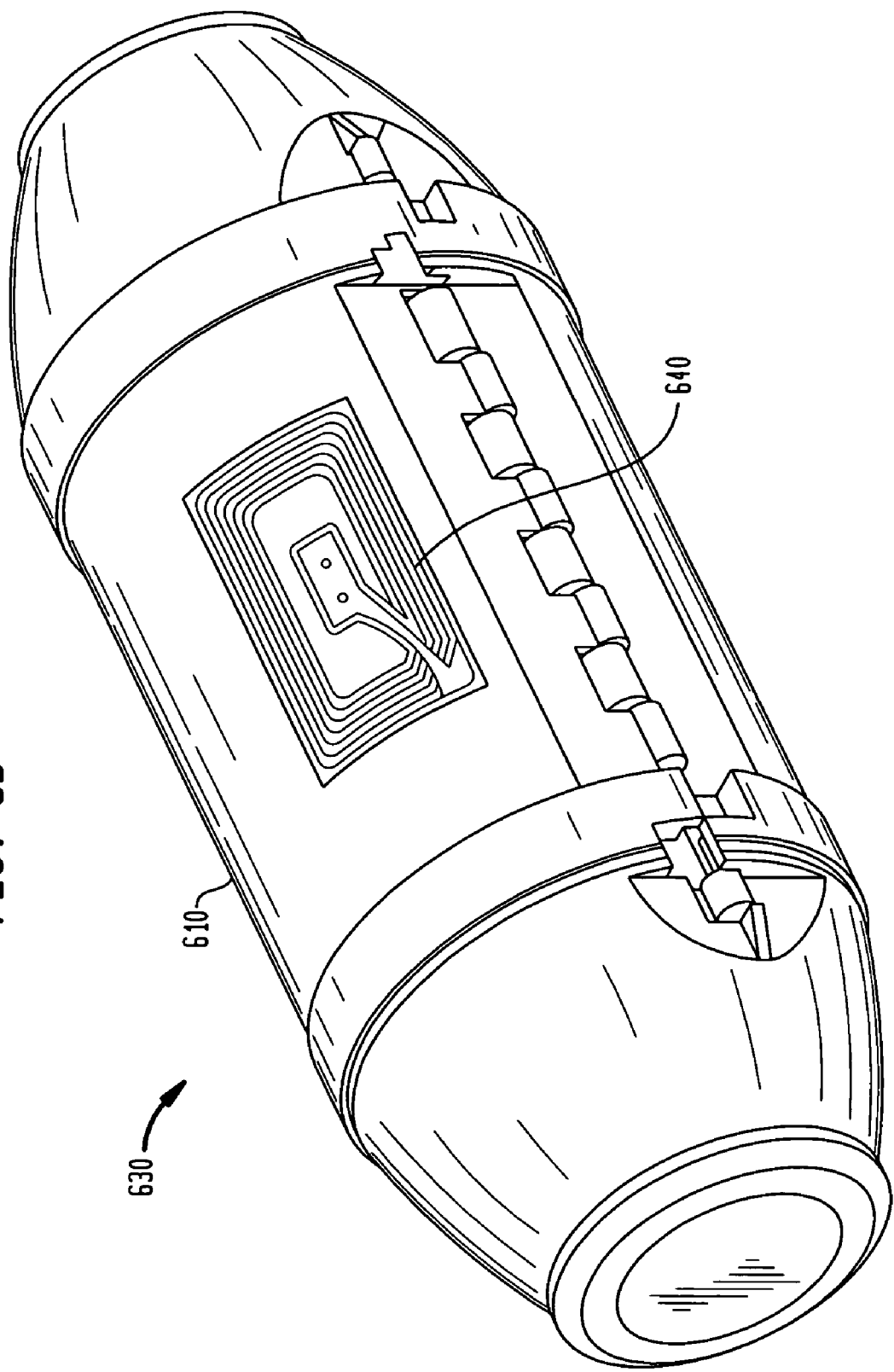
FIG. 6B is a diagram of a carrier having a Radio Frequency Identification ("RFID") tag according to an embodiment of the present principles.

Referring now to FIG. 6B, a diagram of the carrier 610 with a unique identifying RFID tag 640 according to an embodiment 630 of the present principles is shown. The RFID tags 640 may be disposed on any part of the carrier 610, enabling the inline identifying tag readers 220 to scan the RFID tags 640 and transmit the delivery information and reception information to the system control module 222.

Figure 7A:
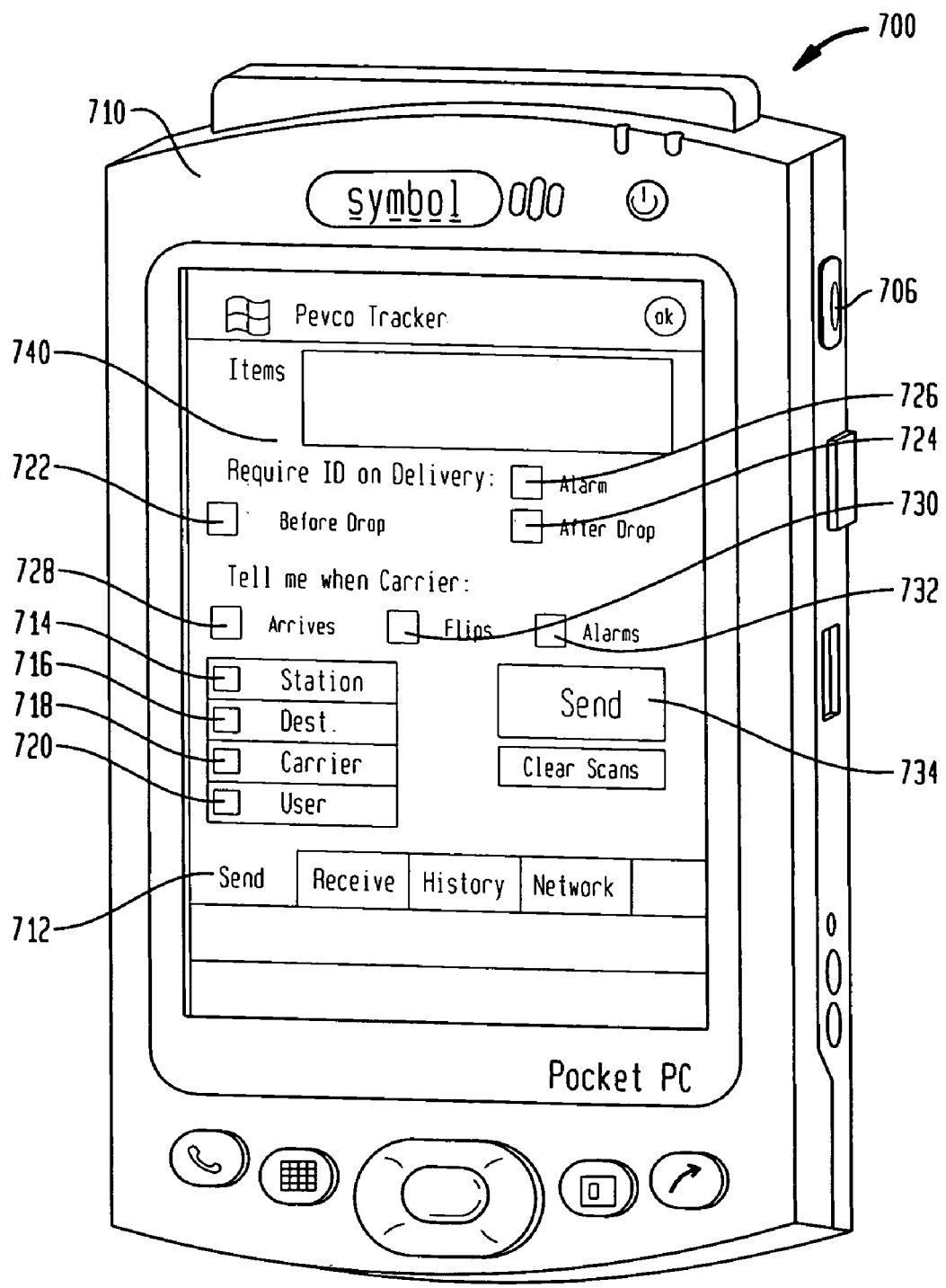
FIGS. 7A and 7B are diagrams of a handheld PDA Reader according to an embodiment of the present principles.
Figure 7B:
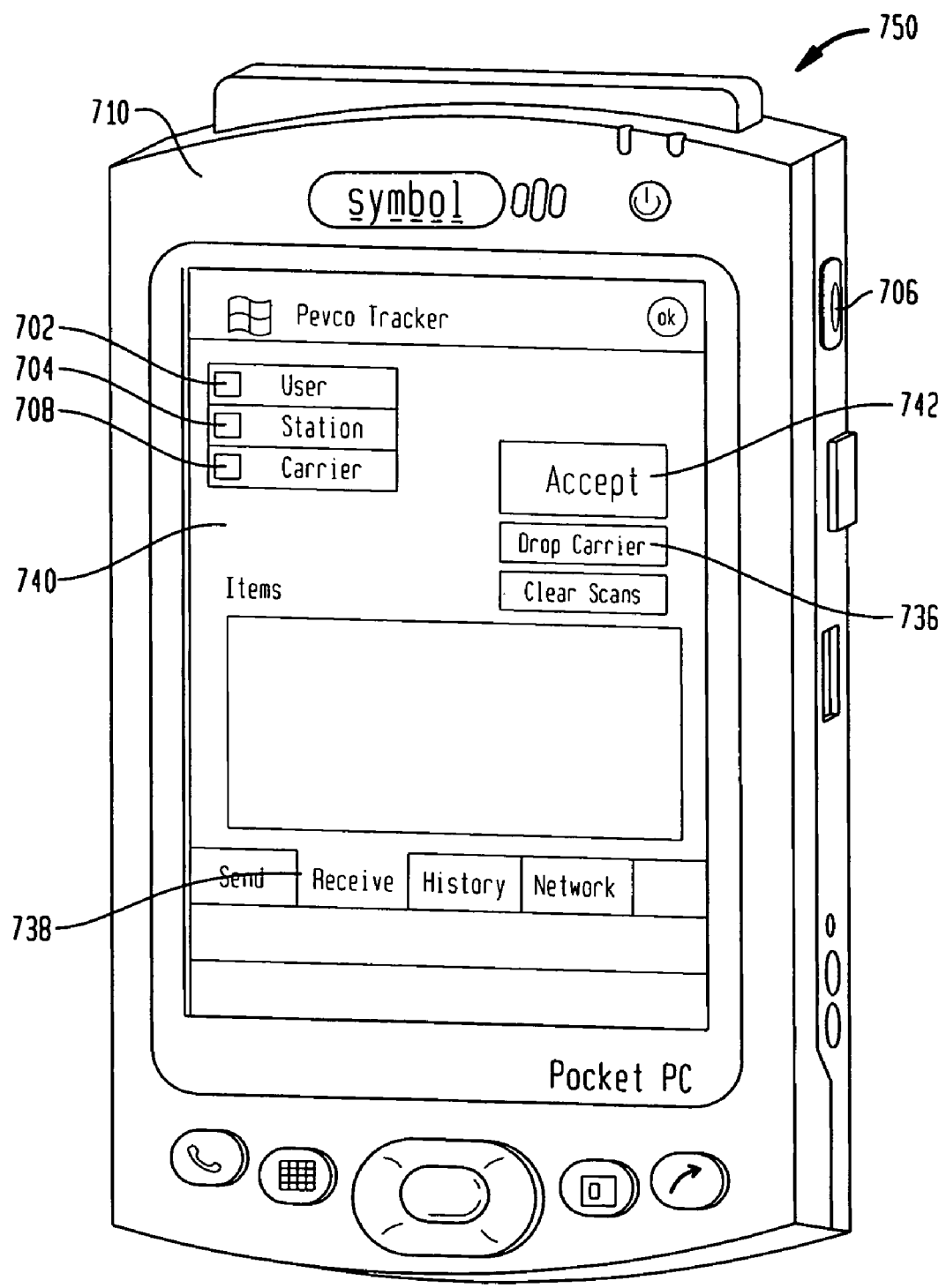

Referring now to FIGS. 7A and 7B, a handheld PDA 700 configured for use as an identifying tag reader and user interface according to an embodiment of the present principles is depicted. While the handheld PDA 700 is described as a useful embodiment of the present principles, it is only exemplary of an identifying tag reader that may be used. For example, a non-handheld PDA may be used, in addition to a touch key initialization module attached to a wall, etc.

The handheld PDA 700 is provided to capture and present data associated with sending and receiving pneumatic tube system deliveries. The PDA allows the user to perform operations required to send and receive a carrier delivery transaction without requiring an interface built into each station. The handheld PDA 700 may capture unique identifiers (bar codes, RFID tags, or the like) associated with individual carriers, sending stations, receiving stations, and sending and receiving users to help track the delivery information.

The database module 202 and CCC module 206 may provide notification to a sending user's cell phone, PDA, e-mail, etc., regarding delivery details as well as providing notification to receiving users of incoming carriers based on options chosen from the handheld PDA 700. The handheld PDA 700 may further provide options for secure sending, such as holding a carrier at a station slide plate 236 until the receiving user scans their ID.

The handheld PDA 700 provides real-time information to users. This information transmitted from the handheld PDA 700 and stored in the database module 202 may be password protected and accessible through a web browser or any other useful interface. Handheld PDA 700 is capable of collecting many types of information, including but not limited to the sending user's ID, the content's ID, the carrier's ID, the sending station's sent ID, the receiving station's ID, the time the transaction was requested, the time the carrier left the station, the travel time to carrier destination, the transaction number, whether or not it is a secure send, whether or not an alarm has been chosen, the alarm type if chosen, the time the carrier arrived at it's destination, the receiving user's ID, the time the carrier was scanned upon arrival, and the receiving station ID. While the handheld PDA 700 has at least these capabilities, any combination of these capabilities may be used to track and record delivery information and reception information.

The steps of using the handheld PDA 700 from the sending user's station 224 can be described in reference to FIG. 7A. In one embodiment, in order to initialize a transaction, the sending user first selects the "Send" tab 712 on face 710 of handheld PDA 700. The sending user then scans the sending station ID 104. In one useful embodiment, the scan may be initiated by pressing the scan button 706 on either side of the PDA 700 while holding the PDA 700 up to the unique identifying tags (i.e. bar code, RFID, optical sensor, etc.) used for the sending station ID 104. A check-mark at "Station" 714 may indicate that the sending station ID 104 has been properly scanned. The sending user may scan the receiving station ID 106 and the interface 740 may indicate that "Dest." 716 or the receiving station ID 106 has been properly scanned. Next, the sending user may also scan the carrier ID 114 and the interface 740 may indicate, by showing a check-mark in the box next to "Carrier" 718, that the carrier ID 114 has been properly scanned. The sending user may also scan the carrier contents 110 and the sending user ID 112. The interface 740 may indicate, by a check-mark in the box next to "User" 720, that the sending user ID 112 has been properly scanned.

The sending user then has the option of securely sending the carrier 610 by requiring the receiving user to scan the receiving user ID 120 before or after the carrier 610 drops into the carrier receiving bin 210. If the sending user desires that the receiving user scan their ID 120 before the carrier 610 is delivered, then the sending user may select the "Before Drop" 722 button. A check-mark may appear in the box next to "Before Drop" 722 to indicate that this option has been selected. If the sending user desires that the receiving user scan their ID 120 after the carrier 610 drops, then the sending user chooses the "After Drop" 724 button and the interface 740 may indicate via a check-mark in the box next to "After Drop" 724 to show that this option has been selected.

If the sending user chooses "After Drop" 724, the sending user also has the option of selecting "Alarm" 726 to be notified if the receiving user does not scan their receiving user ID 120 after the carrier 610 drops. A check-mark may appear in the box next to "Alarm" 726 to indicate that this option has been selected. Further, the sending user can choose to be notified when the carrier 610 "Arrives" 728, "Flips" 730, or "Alarms" 732. A check-mark next to an appropriate label may indicate which options have been selected. The sending user may also send the carrier 610 by selecting the send button 734 to complete the transaction.

The steps of using the handheld PDA 700 from the receiving station 208 can be described in reference to FIG. 7B. In order to receive a carrier delivery the receiving user first selects the "Receive" tab 738 on the face 710 of handheld PDA 700. Alternately, the system control module 222 may notify the receiving user that a carrier 610 has arrived. The receiving user may scan any ID, such as their user ID or the carrier ID, by pressing the scan button 706 on either side of the PDA 700 while holding the PDA 700 up to the unique identifying tags. A check-mark may, for example, appear in the interface 740 of the PDA 700 in the box next to "Station" 704 to show that the receiving station ID 104 has been properly scanned or the interface 740 may indicate by a check-mark in the box next to "User" 702 to show that the receiving user ID 120 has been properly scanned and "Carrier" 708 to show that the carrier ID 122 has been properly scanned. The receiving user may also select the "Drop Carrier" 736 button to manually release the carrier 610 into the carrier receiving bin 210 in the receiving station 208.

The receiving user may initiate the recordation of a received carrier by selecting the "Receive" tab 738. The receiving user may scan the receiving station ID 106, the receiving user ID 120 or carrier ID 122. The user interface on the PDA may show, via, for example, a checkmark next to the "Station" 704, "User" 702 and "Carrier" 708 icons to indicate that the associated ID has been properly scanned. The receiving user may select the "Accept" 742 button on the user interface 740 to complete the transaction. The sending user may receive a confirmation message that the carrier 610 was delivered is that option was selected when the carrier 610 was sent. While in one useful embodiment a check mark may be used as an indicator of selections and properly scanned IDs, any other indicator may be used without deviating from the scope of the invention. For example, an "x" may indicate that an ID was properly scanned, an ID or selection may be highlighted to indicate that it was properly scanned, or any other interface may be used that is known in the art or as yet undiscovered.

While the interface for the PDA 700 is described herein as having a specific type of interface for reading specific types of IDs and permitting the user to interact with the tracking system, any interface permitting a user to interact with the tracking system may be advantageously disposed on the PDA 700 or on any other input element. Likewise, while the PDA 700 may actively read ID tags, such as bar codes or optical codes, the PDA 700 may also passively read RFID tags or other radio frequency identifiers, or may use any combination of passive and active ID detection. For example, a user may have an RFID badge that is passively read while the carrier may have an optical ID tag that is actively read. In another useful embodiment, the PDA 700 may be associated with a particular user, sending station, receiving station, or the like, the ID for which is stored in the PDA 700 or elsewhere in the tracking system for recall when a user sends a payload. In such an embodiment, the PDA 700 may automatically attribute the stored user ID, sending station ID, or receiving station ID to the outgoing payload.

It will be appreciated that although the above pneumatic tube carrier tracking system description is described as used in a hospital, the present principles are not limited to such use. For instance, the principles could be used in any other business or enterprises where customized product deliver is desired. While the foregoing embodiments of the principles have been set forth in considerable detail for the purposes of making a complete disclosure of the principles, it will be apparent to those of skill in the art that numerous changes may be made to such features without departing from the spirit and the scope of the present principles.

The invention claimed is:

1. A pneumatic tube carrier tracking system comprising:
   at least one system control module comprising:
      at least one database module; and
      at least one computer control center ("CCC") module in signal communication with said database module;
   at least one sending station having at least one identifying tag reader associated therewith, said at least one identifying tag reader configured to scan at least one identifier tag for delivery information of at least one carrier, said at least one sending station being in signal communication with said at least one system control module; and
   at least one receiving station having at least one identifying tag reader associated therewith, said at least one identifying tag reader configured to scan at least one identifier tag for reception information, said at least one receiving station being in signal communication with said at least one system control module;
   wherein said at least one sending station and said at least one receiving station are routably connected by pneumatic tubing;
   wherein said at least one system control module captures tracking information associated with sending and receiving said at least one carrier;
   wherein said at least one CCC module is configured to receive said delivery information from said at least one sending station and said reception information from said at least one receiving station;
   wherein said at least one database module is configured to store said delivery information and said reception information from said CCC module; and
   wherein said at least one CCC module is further configured to interpret said delivery information and said reception information and send commands to said pneumatic tube carrier tracking system to control routing of said at least one carrier in said pneumatic tubing.

2. The system according to claim 1, further comprising at least one optical sensor disposed in said pneumatic tubing and configured to sense at least one carrier for carrier location information, said at least one optical sensor being in signal communication with said at least one system control module and further configured to transmit said carrier location information to said at least one CCC module.

3. The system according to claim 1, further comprising at least one diverter in said pneumatic tube carrier tracking system to direct said at least one carrier to at least one branch of said pneumatic tubing for delivery to said at least one receiving station, said at least one diverter being in signal communication with said at least one system control module.

4. The system according to claim 1, further comprising at least one slide plate disposed in said pneumatic tubing prior to said receiving station;
   wherein said at least one CCC module is configured to optionally command the said at least one slide plate to engage to hold said at least one carrier above said at least one receiving station based on said delivery information, said at least one slide plate holding said at least one carrier above said at least one receiving station until the receiving user scans a receiving user identification ("ID") and said at least one CCC module verifies said receiving user ID.

5. The system according to claim 1, wherein said at least one identifying tag reader is configured to read said identifier tags consisting of at least one of an optically scannable identifier tag and a Radio Frequency Identification ("RFID") tag.

6. The system according to claim 1, wherein said at least one identifying tag reader is a handheld Personal Digital Assistant ("PDA").

7. The system according to claim 1, wherein said at least one identifier tag scanned at said at least one sending station for said delivery information is associated with at least one of a carrier contents ID, a carrier ID, a sending user ID, a sending station ID, and a receiving station ID.

8. The system according to claim 1, wherein said at least one sending station is configured to permit a sending user to select from a group of notifications to be notified by when said at least one carrier reaches said at least one receiving station, when the receiving user scans the receiving user ID, when said at least one carrier gets stuck in the tube and when said at least one carrier contents have spilled.

9. The system according to claim 1, wherein said at least one identifier tag scanned at said at least one receiving station for said reception information is associated with at least one of a carrier contents ID, a carrier ID, a receiving user ID, and a receiving station ID.

10. A method for sending and tracking a carrier in a pneumatic tube carrier tracking system, said method comprising:
preparing carrier contents for at least one carrier;
scanning at least one identifying tag to capture delivery information by at least one identifying tag reader associated therewith the at least one sending station;
transmitting the delivery information from the at least one identifying tag reader to the at least one system control module;
sending the at least one carrier through the pneumatic tube system from the at least one sending station;
routing the at least one carrier through the pneumatic tube system in response to the delivery information; and
tracking the at least one carrier by reading at least one identifier tag associated with the at least one carrier by at least one optical sensor associated therewith a branch of the pneumatic tubing.

11. The method according to claim 10, wherein said at least one identifier tag scanned at said at least one sending station for said delivery information is associated with at least one of a carrier contents ID, a carrier ID, a sending user ID, a sending station ID, and a receiving station ID.

12. The method according to claim 10, wherein said at least one identifying tag reader is configured to read said identifier tags consisting of at least one of an optically scannable identifier tag and a Radio Frequency Identification ("RFID") tag.

13. The method according to claim 10, wherein said at least one identifying tag reader associated therewith said at least one sending station is a handheld PDA.

14. The method according to claim 10, further comprising:
storing delivery information from said at least one sending station in said database module by said at least one system control module;
interpreting said delivery information stored in said database module by said CCC module; and
controlling the operations of said pneumatic tube carrier tracking system by said CCC module based on interpretation of said delivery information.

15. A method for tracking and receiving a carrier in a pneumatic tube carrier system, said method comprising:
receiving at the at least one receiving station a routed carrier through the pneumatic tube system;
dropping the at least one carrier into the at least one receiving station;
scanning at least one identifier tag to capture reception information by at least one identifying tag reader associated therewith the at least one receiving station;
transmitting the reception information to the at least one system control module by the at least one identifying tag reader; and
notifying the sending user that the at least one carrier has been delivered.

16. The method according to claim 15, wherein the scanning at least one identifier tag further comprises scanning at least one identifier tag associated with at least one of a carrier contents ID, a carrier ID, a receiving user ID, and a receiving station ID.

17. The method according to claim 15, wherein said at least one identifying tag reader is configured to read said identifier tags consisting of at least one of an optically scannable identifier tag and a Radio Frequency Identification ("RFID") tag.

18. The method according to claim 15, wherein said at least one identifying tag reader is a handheld PDA.

19. The method according to claim 15, further comprising:
holding said at least one carrier above said at least one receiving station by at least one slide plate disposed in said pneumatic tube carrier tracking system;
scanning the receiving user ID by said at least one identifying tag reader; and
dropping said at least one carrier in said at least one receiving station upon the receiving user scanning the receiving user ID and said at least one CCC module verifying the receiving user ID.

20. The method according to claim 15, further comprising:
storing reception information from said at least one receiving station in said database module by said at least one system control module;
interpreting said reception information stored in said database module by said CCC module; and
controlling the operations of said pneumatic tube carrier tracking system by said CCC module based on interpretation of said reception information.

21. A method for tracking and controlling a pneumatic tube carrier in a pneumatic tube carrier system, said method comprising:
receiving delivery information from at least one sending station;
logging and storing the delivery information in a database module;
interpreting the delivery information in the database module by a CCC module;
controlling the operations of pneumatic tube system using CCC module to routably deliver at least one carrier;
tracking the at least one carrier in pneumatic tube system by at least one identifying tag reader;
receiving reception information from at least one receiving station; and
notifying sending user when the at least one carrier has been delivered.

22. The method according to claim 21, wherein said system control module receives said delivery information and said reception information from said at least one identifying tag reader.

23. The method according to claim 21, wherein said CCC module sends commands to control the operations of the pneumatic tube carrier tracking system.

24. The method according to claim 21, wherein said delivery information and said reception information recorded and stored by the system control module may be optionally translated into user-friendly data with a web browser to be accessed via a web based application.

25. The method according to claim 21, wherein the pneumatic tube carrier tracking system is in signal communication with said system control module.

* * * * *

US 8,116,906 C1

(12) EX PARTE REEXAMINATION CERTIFICATE (9616th)

United States Patent
Valerino, Sr.

(10) Number: US 8,116,906 C1
(45) Certificate Issued: Apr. 29, 2013

(54) PNEUMATIC TUBE CARRIER TRACKING SYSTEM

(75) Inventor: Fredrick M. Valerino, Sr., Timonium, MD (US)

(73) Assignee: Pevco Systems International, Inc., Baltimore, MD (US)

Reexamination Request:
No. 90/012,144, Feb. 14, 2012

Reexamination Certificate for:
Patent No.: 8,116,906
Issued: Feb. 14, 2012
Appl. No.: 12/288,129
Filed: Oct. 16, 2008

(51) Int. Cl.
*G06F 7/00* (2006.01)

(52) U.S. Cl.
USPC .......................................... 700/229; 700/226

(58) Field of Classification Search
None
See application file for complete search history.

(56) References Cited

To view the complete listing of prior art documents cited during the proceeding for Reexamination Control Number 90/012,144, please refer to the USPTO's public Patent Application Information Retrieval (PAIR) system under the Display References tab.

*Primary Examiner* — Zoila Cabrera

(57) ABSTRACT

A system and method provides for a pneumatic tube carrier tracking system having a system control module that captures and presents tracking information associated with sending and receiving carriers. The pneumatic tube carrier tracking system comprises sending and receiving stations connected by pneumatic tubing, and which are configured to securely send carriers, with receiving users optionally being restricted from unauthorized access of carriers. The sending and receiving stations have identifying tag readers configured to scan identifier tags to read carrier delivery, carrier receipt and receiving user information. Destination and intended recipient information are entered at the sending station when sending a carrier and are transmitted to a system control module, which routably delivers and secures the carriers in response the destination and intended recipient information.

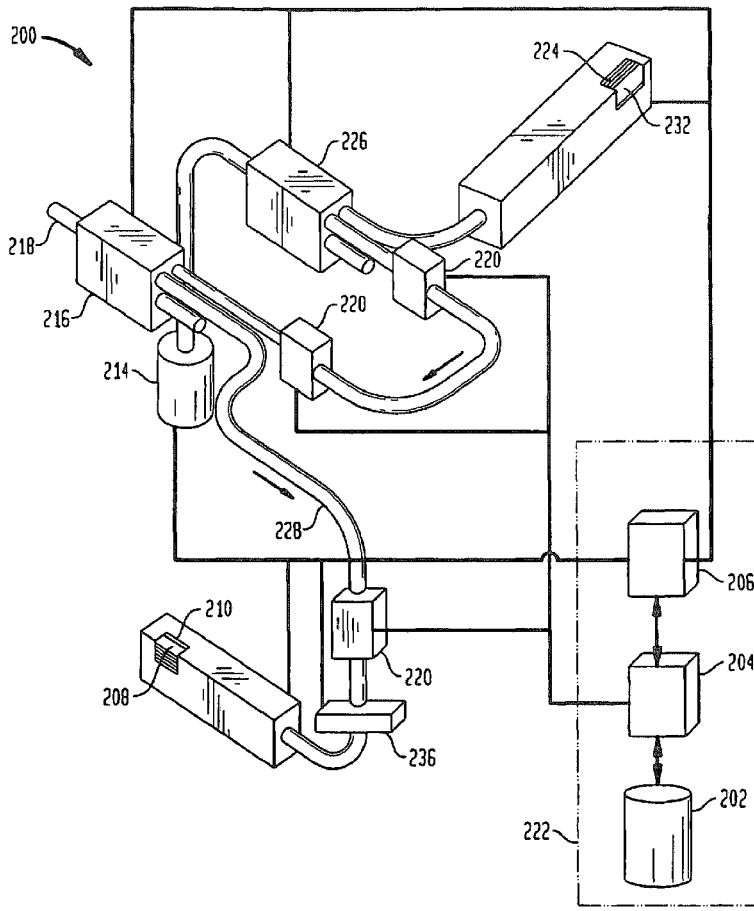

US 8,116,906 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4-22 and 24-25 are determined to be patentable as amended.

Claims 2-3 and 23, dependent on an amended claim, are determined to be patentable.

New claims 26-29 are added and determined to be patentable.

1. A pneumatic tube carrier tracking system comprising:
at least one system control module comprising:
  at least one database module; and
  at least one computer control center ("CCC") module in signal communication with said database module;
at least one sending station having at least one identifying tag reader associated therewith, said at least one identifying tag reader configured to scan at least one identifier tag for delivery information of at least one carrier, said at least one sending station being in signal communication with said at least one system control module; and
at least one receiving station having at least one identifying tag reader associated therewith, said at least one identifying tag reader configured to scan at least one identifier tag for reception information, said at least one receiving station being in signal communication with said at least one system control module; wherein said at least one sending station and said at least one receiving station are routably connected by pneumatic tubing; wherein said at least one system control module captures tracking information associated with sending and receiving said at least one carrier; wherein said at least one CCC module is configured to receive said delivery information from said at least one sending station and said reception information from said at least one receiving station; wherein said at least one database module is configured to store said delivery information and said reception information from said CCC module; and wherein said at least one CCC module is further configured to interpret said delivery information and said reception information and send commands to said pneumatic tube carrier tracking system to control routing of said at least one carrier in said pneumatic tubing, *wherein at least one of the delivery information and the reception information includes a carrier contents ID associated with a content placed into the at least one carrier.*

4. [The system according to claim 1, further comprising] *A pneumatic tube carrier tracking system comprising:*
*at least one system control module comprising:*
  *at least one database module; and*
  *at least one computer control center ("CCC") module in signal communication with said database module;*
*at least one sending station having at least one identifying tag reader associated therewith, said at least one identifying tag reader configured to scan at least one identifier tag for delivery information of at least one carrier, said at least one sending station being in signal communication with said at least one system control module;*
*at least one receiving station having at least one identifying tag reader associated therewith, said at least one identifying tag reader configured to scan at least one identifier tag for reception information, said at least one receiving station being in signal communication with said at least one system control module; wherein said at least one sending station and said at least one receiving station are routably connected by pneumatic tubing; wherein said at least one system control module captures tracking information associated with sending and receiving said at least one carrier; wherein said at least one CCC module is configured to receive said delivery information from said at least one sending station and said reception information from said at least one receiving station; wherein said at least one database module is configured to store said delivery information and said reception information from said CCC module; and wherein said at least one CCC module is further configured to interpret said delivery information and said reception information and send commands to said pneumatic tube carrier tracking system to control routing of said at least one carrier in said pneumatic tubing; and*
*at least one slide plate disposed in said pneumatic tubing prior to said receiving station; wherein said at least one CCC module is configured to optionally command the said at least one slide plate to engage to hold said at least one carrier above said at least one receiving station based on said delivery information, said at least one slide plate holding said at least one carrier above said at least one receiving station until the receiving user scans a receiving user identification ("ID") and said at least one CCC module verifies said receiving user ID.*

5. The system according to claim 1, wherein said at least one identifying tag reader *of at least one of the at least one sending station and the at least one receiving station* is configured to read said *at least one* identifier [tags] *tag* consisting of at least one of an optically scannable identifier tag and a Radio Frequency Identification ("RFID") tag.

6. [The system according to claim 1] *A pneumatic tube carrier tracking system comprising:*
*at least one system control module comprising:*
  *at least one database module; and*
  *at least one computer control center ("CCC") module in signal communication with said database module;*
*at least one sending station having at least one identifying tag reader associated therewith, said at least one identifying tag reader configured to scan at least one identifier tag for delivery information of at least one carrier, said at least one sending station being in signal communication with said at least one system control module;*
*at least one receiving station having at least one identifying tag reader associated therewith, said at least one identifying tag reader configured to scan at least one identifier tag for reception information, said at least one receiving station being in signal communication with said at least one system control module; wherein said at least one sending station and said at least one receiving station are routably connected by pneumatic tubing; wherein said at least one system control module captures tracking information associated with sending and receiving said at least one carrier; wherein said at least one CCC module is configured to receive said delivery information from said at least one sending station and* said reception information from said at least one receiving station; wherein said at least one database module is configured to store said delivery information and said reception information from said CCC module; and wherein said at least one CCC module is further configured to interpret said delivery information and said reception information and send commands to said pneumatic tube carrier tracking system to control routing of said at least one carrier in said pneumatic tubing, wherein said at least one identifying tag reader *of at least one of the at least one sending station and the at least one receiving station* is a handheld Personal Digital Assistant ("PDA").

7. The system according to claim 1, wherein said at least one identifier tag scanned at said at least one sending station for said delivery information is associated with at least one of [a carrier contents ID,] a carrier ID, a sending user ID, a sending station ID, *a receiving user ID*, and a receiving station ID.

8. [The system according to claim 1] *A pneumatic tube carrier tracking system comprising:*
　*at least one system control module comprising:*
　　*at least one database module; and*
　　*at least one computer control center ("CCC") module in signal communication with said database module;*
　*at least one sending station having at least one identifying tag reader associated therewith, said at least one identifying tag reader configured to scan at least one identifier tag for delivery information of at least one carrier, said at least one sending station being in signal communication with said at least one system control module;*
　*at least one receiving station having at least one identifying tag reader associated therewith, said at least one identifying tag reader configured to scan at least one identifier tag for reception information, said at least one receiving station being in signal communication with said at least one system control module; wherein said at least one sending station and said at least one receiving station are routably connected by pneumatic tubing; wherein said at least one system control module captures tracking information associated with sending and receiving said at least one carrier; wherein said at least one CCC module is configured to receive said delivery information from said at least one sending station and said reception information from said at least one receiving station; wherein said at least one database module is configured to store said delivery information and said reception information from said CCC module; wherein said at least one CCC module is further configured to interpret said delivery information and said reception information and send commands to said pneumatic tube carrier tracking system to control routing of said at least one carrier in said pneumatic tubing, and* wherein said at least one sending station is configured to permit a sending user to select from a group of notifications to be notified by when said at least one carrier reaches said at least one receiving station, when the receiving user scans the receiving user ID, when said at least one carrier gets stuck in the [tube] *pneumatic tubing* and when said at least one carrier contents have spilled.

9. The system according to claim 1, wherein said at least one identifier tag scanned at said at least one receiving station for said reception information is associated with at least one of [a carrier contents ID,] a carrier ID, a receiving user ID, and a receiving station ID.

10. A method for sending and tracking a carrier in a pneumatic tube carrier tracking system, said method comprising:
　preparing carrier contents for at least one carrier;
　scanning at least one [identifying] *identifier* tag to capture delivery information by at least one identifying tag reader associated therewith the at least one sending station;
　transmitting the delivery information from the at least one identifying tag reader to [the] *at least one* system control module;
　sending the at least one carrier through [the] *a* pneumatic tube system from the at least one sending station;
　routing the at least one carrier through the pneumatic tube system in response to the delivery information; and
　tracking the at least one carrier by reading *the* at least one identifier tag associated with the at least one carrier by at least one optical sensor associated therewith a branch of the pneumatic [tubing] *tube system, wherein the delivery information includes a carrier contents ID associated with a content placed into the at least one carrier*.

11. The method according to claim 10, wherein said at least one identifier tag scanned at said at least one sending station for said delivery information is associated with at least one of [a carrier contents ID,] a carrier ID, a sending user ID, a sending station ID, and a receiving station ID.

12. The method according to claim 10, wherein said at least one identifying tag reader *of at least one of the at least one sending station and the at least one receiving station* is configured to read said at *least one* identifier [tags] *tag* consisting of at least one of an optically scannable identifier tag and a Radio Frequency Identification ("RFID") tag.

13. [The method according to claim 10] *A method for sending and tracking a carrier in a pneumatic tube carrier tracking system, said method comprising:*
　*preparing carrier contents for at least one carrier;*
　*scanning at least one identifer tag to capture delivery information by at least one identifying tag reader associated therewith the at least one sending station;*
　*transmitting the delivery information from the at least one identifying tag reader to* [the] *at least one system control module;*
　*sending the at least one carrier through a pneumatic tube system from the at least one sending station;*
　*routing the at least one carrier through the pneumatic tube system in response to the delivery information; and*
　*tracking the at least one carrier by reading the at least one identifier tag associated with the at least one carrier by at least one optical sensor associated therewith a branch of the pneumatic tube system,* wherein said at least one identifying tag reader associated therewith said at least one sending station is a handheld PDA.

14. The method according to claim 10, further comprising:
　storing delivery information from said at least one sending station in [said] *a* database module by said at least one system control module;
　interpreting said delivery information stored in said database module by [said] *at least one computer control center ("CCC")* module; and
　controlling the operations of said pneumatic tube carrier tracking system by said CCC module based on interpretation of said delivery information.

15. A method for tracking and receiving [a] *at least one* carrier in a pneumatic tube carrier *tracking* system, said method comprising:
　receiving at [the] at least one receiving station a routed carrier through [the] *a* pneumatic tube system;
　dropping the at least one carrier into the at least one receiving station;

scanning at least one identifier tag to capture reception information by at least one identifying tag reader associated therewith the at least one receiving station;

transmitting the reception information to [the] at least one system control module by the at least one identifying tag reader; and notifying [the] *a* sending user that the at least one carrier has been delivered, *wherein the reception information includes a carrier contents ID associated with a content placed into the at least one carrier*.

16. The method according to claim 15, wherein the scanning at least one identifier tag further comprises scanning at least one identifier tag associated with at least one of [a carrier contents ID,] a carrier ID, a receiving user ID, and a receiving station ID.

17. The method according to claim 15, wherein said at least one identifying tag reader is configured to read said *at least one* identifier [tags] *tag* consisting of at least one of an optically scannable identifier tag and a Radio Frequency Identification ("RFID") tag.

18. [The method according to claim 15] *A method for tracking and receiving at least one carrier in a pneumatic tube carrier tracking system, said method comprising:* receiving at at least one receiving station a routed carrier through a pneumatic tube system;

dropping the at least one carrier into the at least one receiving station;

scanning at least one identifier tag to capture reception information by at least one identifying tag reader associated therewith the at least one receiving station;

transmitting the reception information to at least one system control module by the at least one identifying tag reader; and notifying a sending user that the at least one carrier has been delivered, wherein said at least one identifying tag reader is a handheld PDA.

19. [The method according to claim 15, further comprising:] *A method for tracking and receiving at least one carrier in a pneumatic tube carrier tracking system, said method comprising:* receiving at at least one receiving station a routed carrier through a pneumatic tube system;

dropping the at least one carrier into the at least one receiving station;

scanning at least one identifier tag to capture reception information by at least one identifying tag reader associated therewith the at least one receiving station;

transmitting the reception information to at least one system control module by the at least one identifying tag reader;

notifying a sending user that the at least one carrier has been delivered holding said at least one carrier above said at least one receiving station by at least one slide plate disposed in said pneumatic tube [carrier tracking] system;

scanning [the] *a* receiving user ID by said at least one identifying tag reader; and dropping said at least one carrier in said at least one receiving station upon [the] *a* receiving user scanning the receiving user ID and [said] at least one *computer control center ("CCC")* module verifying the receiving user ID.

20. The method according to claim 15, further comprising:

storing reception information from said at least one receiving station in [said] *a* database module by said at least one system control module;

interpreting said reception information stored in said database module by [said] *a computer control center ("CCC")* module; and controlling the operations of said pneumatic tube carrier tracking system by said CCC module based on interpretation of said reception information.

21. A method for tracking and controlling a pneumatic tube carrier in a pneumatic tube carrier *tracking* system, said method comprising:

receiving delivery information from at least one sending station;

logging and storing the delivery information in a database module;

interpreting the delivery information in the database module by *a computer control center ("CCC")* module;

controlling the operations of *the* pneumatic tube *carrier tracking* system using *the* CCC module to routably deliver at least one carrier;

tracking the at least one carrier in a pneumatic tube system by at least one identifying tag reader;

receiving reception information from at least one receiving station; and notifying *a* sending user when the at least one carrier has been delivered, *wherein at least one of the delivery information and the reception information includes a carrier contents ID associated with a content placed into the at least one carrier*.

22. The method according to claim 21, wherein [said] *a* system control module receives said delivery information and said reception information from said at least one identifying tag reader.

24. The method according to claim 21, wherein said delivery information and said reception information [recorded and stored by the system control module may be optionally] *is* translated into user-friendly data with a web browser to be accessed via a web based application.

25. The method according to claim [21] *22*, wherein the pneumatic tube carrier tracking system is in signal communication with said system control module.

*26. The system according to claim 1, wherein the carrier contents ID is scanned by the at least one identifying tag reader of at least one of the at least one sending station and the at least one receiving station.*

*27. The method according to claim 10, wherein the carrier contents ID is scanned by the at least one identifying tag reader of the at least one sending station.*

*28. The method according to claim 15, wherein the carrier contents ID is scanned by the at least one identifying tag reader of the at least one receiving station.*

*29. The method according to claim 21, wherein the carrier contents ID is scanned by at least one identifying tag reader of at least one of at least one sending station and at least one receiving station.*

\* \* \* \* \*

(12) EX PARTE REEXAMINATION CERTIFICATE (9797th)
United States Patent
Valerino, Sr.

(10) Number: US 8,116,906 C2
(45) Certificate Issued: Aug. 14, 2013

(54) PNEUMATIC TUBE CARRIER TRACKING SYSTEM

(75) Inventor: Fredrick M. Valerino, Sr., Timonium, MD (US)

(73) Assignee: Pevco Systems International, Inc., Baltimore, MD (US)

Reexamination Request:
No. 90/012,618, Sep. 14, 2012

Reexamination Certificate for:
Patent No.: 8,116,906
Issued: Feb. 14, 2012
Appl. No.: 12/288,129
Filed: Oct. 16, 2008

Reexamination Certificate C1 8,116,906 issued Apr. 29, 2013

(51) Int. Cl.
*G06F 7/00* (2006.01)
(52) U.S. Cl.
USPC .......................................... 700/229; 700/226
(58) Field of Classification Search
None
See application file for complete search history.

(56) References Cited

To view the complete listing of prior art documents cited during the proceeding for Reexamination Control Number 90/012,618, please refer to the USPTO's public Patent Application Information Retrieval (PAIR) system under the Display References tab.

*Primary Examiner* — Zoila Cabrera

(57) ABSTRACT

A system and method provides for a pneumatic tube carrier tracking system having a system control module that captures and presents tracking information associated with sending and receiving carriers. The pneumatic tube carrier tracking system comprises sending and receiving stations connected by pneumatic tubing, and which are configured to securely send carriers, with receiving users optionally being restricted from unauthorized access of carriers. The sending and receiving stations have identifying tag readers configured to scan identifier tags to read carrier delivery, carrier receipt and receiving user information. Destination and intended recipient information are entered at the sending station when sending a carrier and are transmitted to a system control module, which routably delivers and secures the carriers in response the destination and intended recipient information.

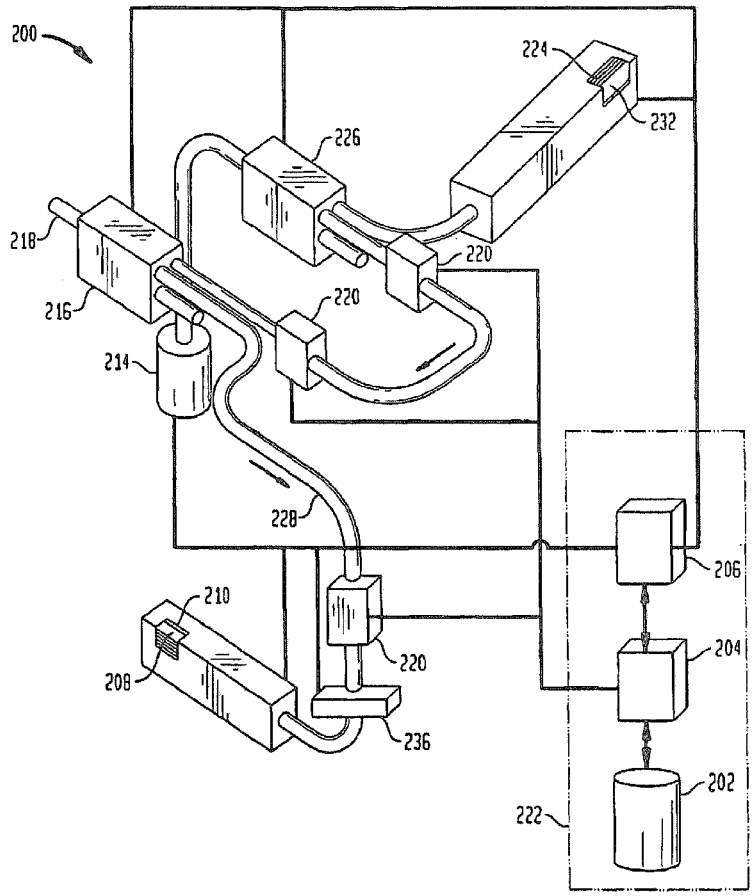

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1 and 15 is confirmed.

Claims 4 and 19 are cancelled.

Claims 2, 3, 5-14, 16-18 and 20-29 were not reexamined.

* * * * *